US012063733B2

(12) United States Patent
Steier et al.

(10) Patent No.: US 12,063,733 B2
(45) Date of Patent: Aug. 13, 2024

(54) HOUSEHOLD OVEN WITH LED ILLUMINATION

(71) Applicant: V-Zug AG, Zug (CH)

(72) Inventors: Irina Steier, Waltenschwill (CH); Raphael Lindegger, Lucerne (CH); Andreas Ranalder, Buchs (CH)

(73) Assignee: V-ZUG AG, Zug (CH)

( * ) Notice: Subject to any disclaimer, the term of this patent is extended or adjusted under 35 U.S.C. 154(b) by 655 days.

(21) Appl. No.: 17/296,061

(22) PCT Filed: Nov. 22, 2018

(86) PCT No.: PCT/CH2018/000047

§ 371 (c)(1),
(2) Date: May 21, 2021

(87) PCT Pub. No.: WO2020/102916

PCT Pub. Date: May 28, 2020

(65) Prior Publication Data

US 2022/0022291 A1 Jan. 20, 2022

(51) Int. Cl.

*H05B 6/64* (2006.01)
*F21V 29/51* (2015.01)
*F21V 29/70* (2015.01)
*F21V 33/00* (2006.01)
*F21Y 115/10* (2016.01)

(52) U.S. Cl.

CPC ........... *H05B 6/6444* (2013.01); *F21V 29/51* (2015.01); *F21V 29/70* (2015.01); *F21V 33/0044* (2013.01); *F21Y 2115/10* (2016.08)

(58) Field of Classification Search

CPC .... H05B 6/6402; H05B 6/6444; H05B 6/647; H05B 6/6473; F21V 29/51; F21V 29/70; F21V 29/71; F21V 29/713; F21V 29/74; F21V 33/0044; F21Y 2115/10
See application file for complete search history.

(56) References Cited

U.S. PATENT DOCUMENTS 4,618,756 A * 10/1986 Schwaderer ......... H05B 6/6405 219/400
2007/0131669 A1 6/2007 Lee et al.
2009/0316385 A1 12/2009 Weber et al.
(Continued)

FOREIGN PATENT DOCUMENTS

CN 108317550 A 7/2018
DE 102011088087 A1 6/2013
(Continued)

OTHER PUBLICATIONS

International Search Report for PCT Serial No. PCT/CH2018/000047 dated Sep. 16, 2019.

*Primary Examiner* — Justin C Dodson
(74) *Attorney, Agent, or Firm* — McCormick, Paulding & Huber PLLC

(57) ABSTRACT

A household oven includes a cooking chamber (6), a light source mount (31), an LED light source (20) arranged on the light source mount (31) to shine light into THE cooking chamber (6), a heat sink (16), and a heat pipe (15) thermally coupling the LED light source (20) to the heat sink (16). This design allows to carry off heat from the LED light source (20).

13 Claims, 3 Drawing Sheets

(56) References Cited

U.S. PATENT DOCUMENTS

| | | | | |
|---|---|---|---|---|
| 2011/0049120 | A1* | 3/2011 | Reinhard-Herrscher | F24C 15/008 362/363 |
| 2013/0020315 | A1* | 1/2013 | Tatsumu | H05B 6/6411 219/725 |
| 2016/0320069 | A1* | 11/2016 | Hettinger | F24C 15/008 |
| 2018/0156443 | A1 | 6/2018 | Luo et al. | |
| 2019/0107290 | A1* | 4/2019 | Signorino | F24C 15/008 |
| 2020/0080783 | A1* | 3/2020 | Wild | G01D 11/245 |

FOREIGN PATENT DOCUMENTS

| | | | | |
|---|---|---|---|---|
| DE | 102012223463 | A1 | 6/2014 | |
| JP | H02244588 | A | 9/1990 | |
| WO | 2009141069 | A1 | 11/2009 | |
| WO | 2011155783 | A1 | 12/2011 | |
| WO | WO-2011155783 | A1 * | 12/2011 | F21V 29/004 |
| WO | 2017088074 | A1 | 6/2017 | |

* cited by examiner

HOUSEHOLD OVEN WITH LED ILLUMINATION

CROSS-REFERENCE TO RELATED APPLICATION

This application is a National Stage application of International Patent Application No. PCT/CH2018/000047, filed on Nov. 22, 2018, which is hereby incorporated by reference in its entirety.

TECHNICAL FIELD

The invention relates to a household oven with a cooking chamber and an LED light source arranged to shine light into the cooking chamber.

BACKGROUND

Various designs for illuminating the cooking chamber of a household oven by means of an LED light source have been know.

In order to prevent the heat in the cooking chamber from damaging the LED, WO 2009/141069, WO 2017/088074, and DE 102012223463 suggest to arrange the LED at a distance from the cooking chamber and to use light guides or reflectors to direct its light into the chamber. Such long light guides or complex reflectors are, however, expensive and complicated to install and they may lead to an undesired loss of light.

SUMMARY

The problem to be solved by the present invention is to provide a household oven with LED illumination that is economical and simple.

This problem is solved by the household oven of claim 1. Accordingly, the oven comprises:

- A cooking chamber: This is the chamber intended to receive the foodstuff to be cooked or heated.
- A light source mount: This is the mount for holding the LED light source described below.
- An LED light source: The LED light source is mounted to the light source mount and comprises at least one light emitting diode and it is arranged to shine light into the cooking chamber.
- A heat sink: The heat sink is provided for carrying off heat from the LED light source, thereby reducing its temperature. There may be several such heat sinks.
- A heat pipe: The heat pipe thermally couples the LED light source to the heat sink. There may be several such heat pipes.

This design allows to place the LED light source nearer to the cooking chamber than conventional solutions because the heat pipe allows to cool the light source efficiently.

In the present context, a heat pipe is a heat-transfer device that combines the principles of both thermal conductivity and phase transition to effectively transfer heat between a hot and a cold side. It is a closed, passive system containing a fluid that can evaporate at the hot side, diffuse to the cold side in its gaseous state, and condense at the cold side. The condensed liquid from the cold side is conveyed back to the hot side, e.g. by means of capillary action and/or gravity.

In one embodiment, the oven comprises an air duct arranged outside the cooking chamber. A fan located in or at the air duct can be used to convey air through the air duct.

In that case, the heat sink is advantageously located at least partially in or at the air duct for cooling.

The air duct can e.g. be located between an outer housing of the oven and the cooking chamber. The cooking chamber is arranged within the outer housing.

The oven may comprise a microwave generator coupled to the cooking chamber in order to heat the foodstuff by means of microwave radiation.

In that case, the microwave generator can be located at least partially in or at (i.e. within or immediately adjacent to) the air duct mentioned above for cooling, i.e. the same air duct can be used to cool the microwave generator and the heat sink.

The wall of the cooking chamber can comprise an opening. The LED light source is arranged adjacent to this opening for shining light into the cooking chamber. Advantageously, the LED light source is positioned to directly shine line into the cooking chamber, i.e. a majority of the light arrives in the cooking chamber without being subject to reflection between the LED light source and the cooking chamber.

The oven can further comprise:

- A printed circuit substrate with the LED light source being mounted to a first side of the printed circuit substrate. The printed circuit substrate may be a printed circuit board or a flexible circuit carrier.
- A base body arranged on a second side of the printed circuit substrate.

The first end of the heat pipe is in contact with the base body and the second end of the heat pipe is in contact with the heat sink.

In this design, the base body carries the printed circuit substrate and drains heat therefrom to the heat pipe.

The base body is advantageously of a material with good thermal conductivity, e.g. as defined in the description below, such as of a metal, in particular of copper or aluminum.

The heat sink may be located at least partially higher than a top side of this cooking chamber. In this region, most ovens have a space for electronics and secondary equipment where temperatures are moderate.

For the same reason, the heat sink may also be located at least partially at the back side of the oven. In more accurate terms, the oven may comprise a user door defining the 'front side' of thereof. The heat sink may then be located at least partially further away from said front side than any part of the cooking chamber.

BRIEF DESCRIPTION OF THE DRAWINGS

The invention will be better understood and objects other than those set forth above will become apparent when consideration is given to the following detailed description thereof. This description makes reference to the annexed drawings, wherein.

DETAILED DESCRIPTION

General Introduction, First Embodiment

Figure 1:
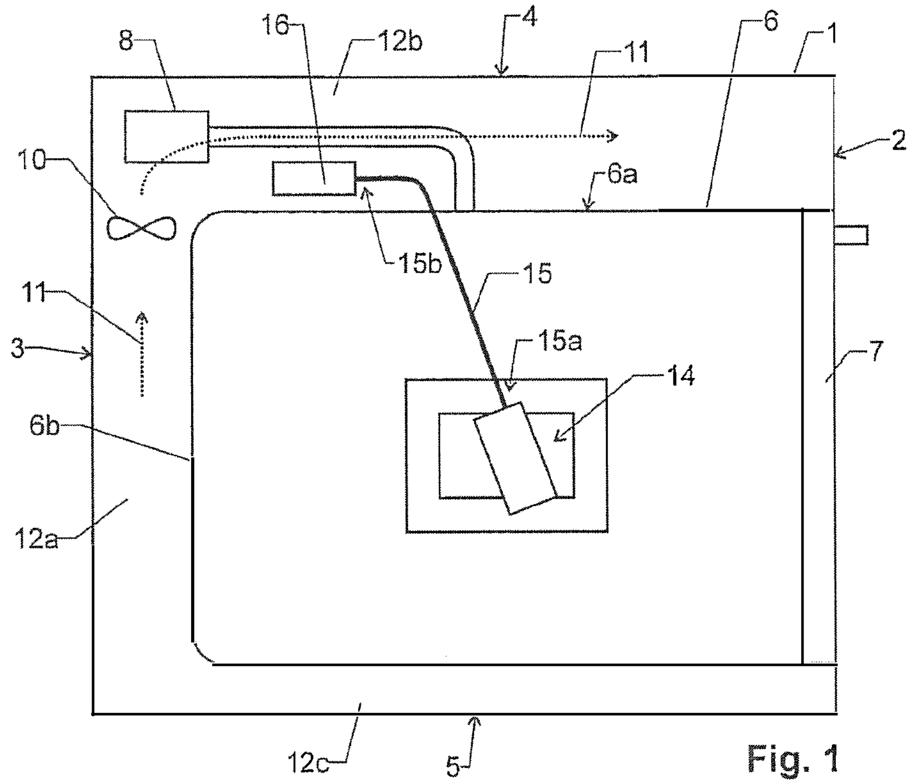
FIG. 1 is a schematic view of an oven with an LED light source.
Figure 2:
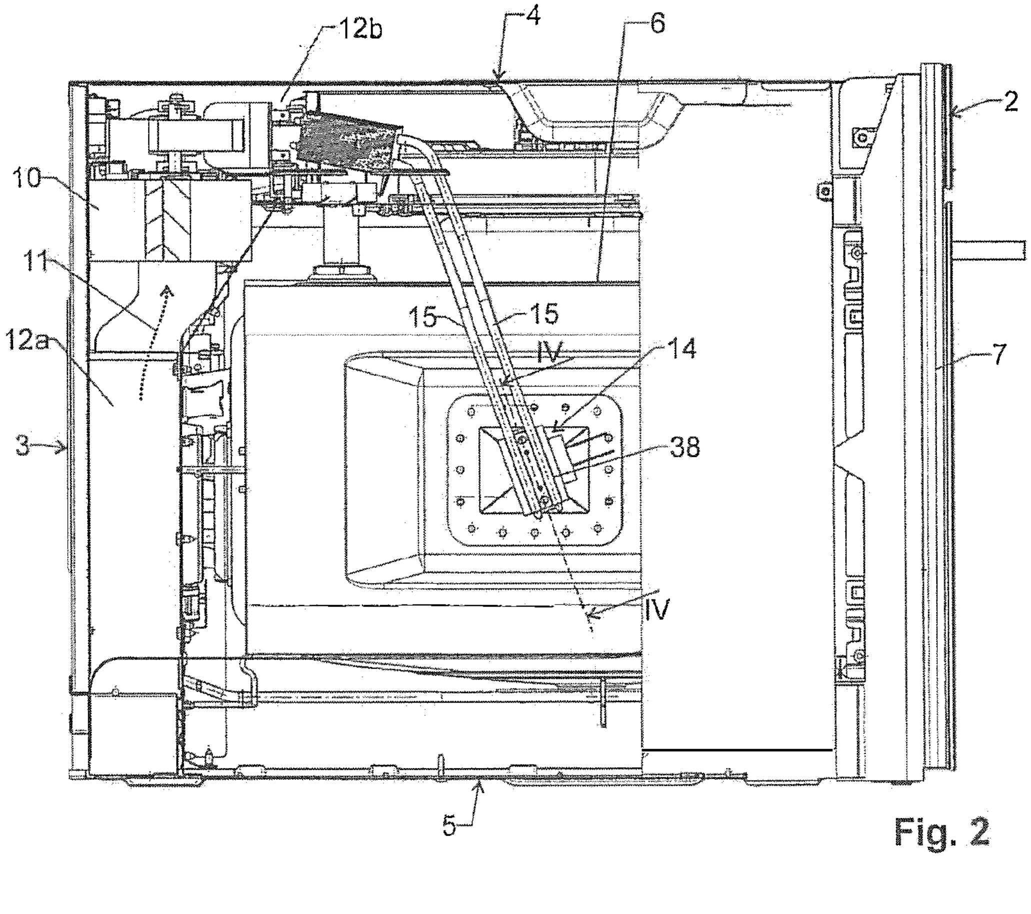
FIG. 2 is a somewhat simplified view of an implementation of such an oven from one side (with the side wall of its housing removed)

The oven of FIG. 1 comprises a housing 1 with a front side 2, a backside 3, a top side 4 and a bottom side 5.

A cooking chamber 6 is arranged within housing 1 for receiving foodstuff to be heated or cooked. Cooking chamber 6 has an opening facing front side 2. A user door 7, located at front side 2, is provided for closing cooking chamber 6.

In the embodiment shown, the oven is a microwave oven having a microwave generator 8 for feeding microwave radiation into cooking chamber 6.

Alternatively or in addition thereto, the oven of the current invention may comprise electrical resistive heaters for heating cooking chamber 6.

The oven further comprises at least one fan 10 outside cooking chamber 6 for generating a cooling airflow 11 within housing 1. Airflow 11 may e.g. be used to cool microwave generator 8 and/or other electrical components outside cooking chamber 6.

Airflow 11 flows to an air duct 12*a*-12*c* located outside cooking chamber 6. Air duct 12*a*-12*c* can e.g. be formed by the space between housing 1 and cooking chamber 6 above and/or behind and/or below cooking chamber 6.

An illumination assembly 14 comprising at least one LED light source is arranged e.g. at a side wall of cooking chamber 6 to shine line into the interior of the chamber.

Illumination assembly 14 may e.g. also comprise an array of LED light sources arranged e.g. in a row, with each light source located at its own opening for shining light into the chamber.

Illumination assembly 14 is connected to a first end 15*a* of a heat pipe 15. Second end 15*b* of heat pipe 15 is located at a heat sink 16.

In operation, heat pipe 15 carries off heat from illumination assembly 14 to heat sink 16.

Heat sink 16 is located in a comparatively cool region of the oven. In the embodiment of FIG. 1, heat sink 16 is located at a top region of the oven, i.e. at last part of it is located higher than the top side 6*a* of cooking chamber 6. In this region, temperatures are e.g. no more than 60° C., which allows to carry off heat from the potentially much hotter illumination assembly 14.

Advantageously, heat sink 16 is located at least partially in or at said air duct 12*a*-12*c* such that it can profit from the cooling by air flow 11.

Heat sink comprises e.g. a plurality of parallel, metallic heat exchanging plates thermally connected to second end 15*b* of heat pipe 15. It can be of a thermally well-conducting metal, such as aluminum or copper.

Second Embodiment

FIGS. 2-5 shows a second, more detailed embodiment of the oven, which basically corresponds to the one of FIG. 1.

In this embodiment, fan 10 is a radial ventilator aspiring air from section 12*c* of the air duct below cooking chamber 6 and section 12*a* of the air duct behind cooking chamber 6 and expelling it into section 12*b* of the air duct above cooking chamber 6, with heat sink 16 being located in section 12*b*.

In the embodiment shown, there are at least two heat pipes 15 extending between illumination assembly 14, i.e. the LED light source, and heat sink 16 for increased thermal conduction.

Figure 4:
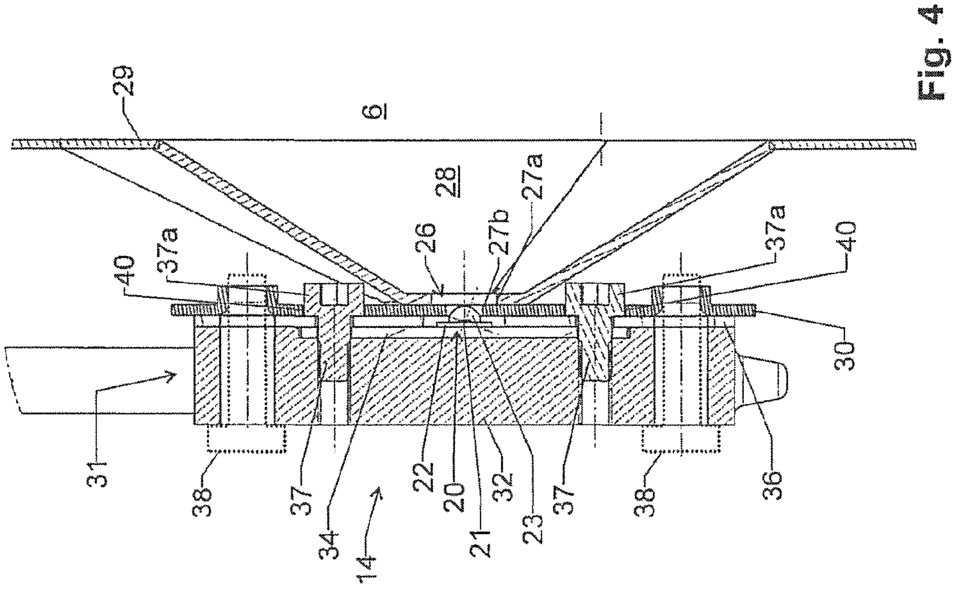
FIG. 4 is a sectional view along line IV-IV of FIG. 2.
Figure 3:
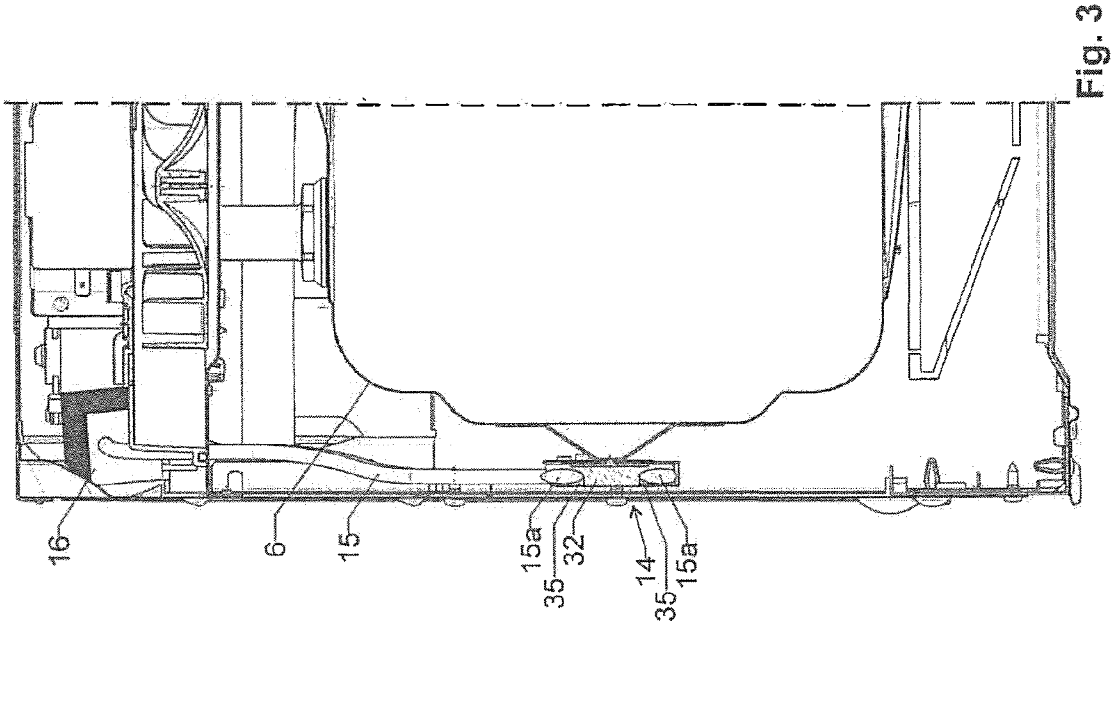
FIG. 3 is a somewhat simplified, partial view of the oven of FIG. 2 from above.
Figure 5:
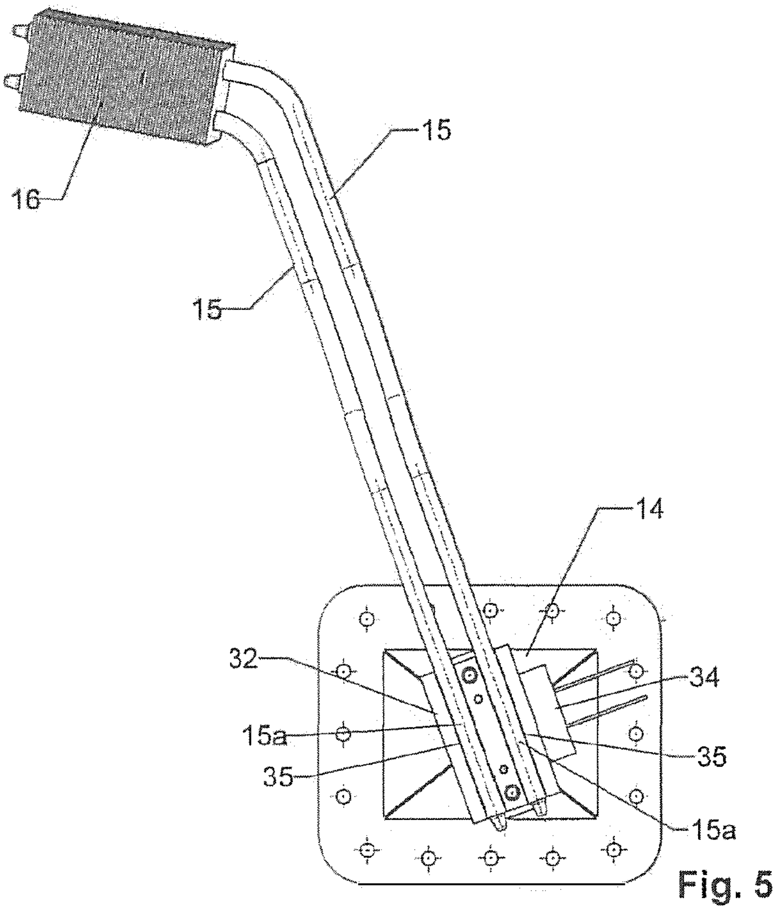
FIG. 5 is an enlarged view of the light source with heat pipes and heat sink of FIG. 2.

The design of illumination assembly 14 is best seen in FIGS. 3-5.

As e.g. shown in FIG. 4, illumination assembly 14 comprises an LED light source 20. In the shown embodiment, LED light source 20 comprises a LED chip 21 that may be arranged on a chip carrier 22 and that may be covered by a lens dome 23 in basically known manner.

LED light source 20 is located adjacent to an opening 26 in the wall 29 of cooking chamber 6. Advantageously, LED chip 21 is close to opening 26, in particular with the distance between LED chip 21 and the center of opening 26 being no more than 10 mm, in particular no more than 5 mm.

It must be noted that wall 29 of cooking chamber 6 can be of a single piece, or it can be assembled from multiple parts. For example, wall 29 at the location of opening 26 may be made of a separate part, such as a trough- or recess-shaped sheet metal connected to the rest of the wall of cooking chamber 6.

Opening 26 is dimensioned to be non-transmitting for the microwave radiation emitted by the microwave generator. In particular, a "non-transmitting" opening is understood to block at least 90%, in particular at least 95%, of the microwave radiation from the microwave generator.

In the shown embodiment, designed for microwave radiation at 2.45 GHz, opening 26 comprises two sections 27*a*, 27*b* with step-like diameter changes on their inner (cooking-chamber-facing) sides. At the inner side of inner section 27*a*, the diameter changes from approximately 12 mm to approximately 6 mm, while at the inner side of outer section 27*b* the diameter changes from approximately 6 mm to approximately 3 mm.

Each such step generates an impedance change that reflects part of the radiation. In addition, the two sections have cut-off frequencies above or approximately at the frequency of the microwave generator.

In more general terms, the most narrow section of opening 26 has advantageously a diameter of less than 6 mm, in particular of less than 3 mm.

In addition or alternatively thereto opening 26 comprises at least two sections 27*a*, 27*b* with step-like diameter changes on their inner (cooking-chamber-facing) sides.

Opening 26 can be located in a recess, in particular a funnel-shaped recess 28, in wall 29, in particular a side wall, of cooking chamber 6.

As can further be seen from FIG. 4, the oven may comprise a carrier 30 mounted to the outside of wall 29 of cooking chamber 6 at the location of opening 26. Carrier 30 is advantageously of metal to withstand the high temperatures of wall 29. Advantageously, carrier 30 is of stainless steel for its low thermal conductivity. It may e.g. be welded to wall 29.

Carrier 30 holds illumination assembly 14 and therefore LED light source 30. It may also form at least part of opening 26, in particular the outer section 27*b* of opening 26.

In addition to LED light source 20, illumination assembly 14 comprises a light source mount 31 including a metal base body 32, a printed circuit substrate 34, and an insulator plate 36.

Base body 32 is advantageously of copper or aluminum. It may, however, also be of another material with good thermal conductivity, such as a material with a thermal conductivity at least 100 W/(m·K), in particular at least 200 W/(m·K). It may e.g. also be a ceramic material, e.g. aluminum nitride.

Printed circuit substrate 34 contains structured electronic leads to feed current to LED light source 20. LED light source 20 is mounted to a first side (namely the side facing cooking chamber 6) of printed circuit substrate 34.

Base body 32 is located on a second side of printed circuit substrate 34 (i.e. on the side facing away from cooking chamber 6). The first end or ends 15*a* of the heat pipe(s) 15 is/are in contact with base body 32. They may be embedded in recesses or openings 35 of base body 32 for better thermal contact. Advantageously, they are soldered to base body 32.

Base body 32 is of a material having high thermal conductivity, in particular aluminum or copper.

A first set of screws 37 and a second set of screws 38 are, as shown in FIG. 4, used to keep the parts of illumination assembly 14 together and to mount the same to carrier 30.

Base body 32 is mounted to carrier 30, e.g. by means of the second set of screws 38 as indicated in dotted lines in FIG. 4.

Insulator plate 36 is arranged between base body 32 and carrier 30. In provides thermal insulation. It can e.g. be of mica. Advantageously, it is non-metallic and provides electrical insulation, too. It may, however, also be metallic.

Printed circuit substrate 34 is arranged between insulator plate 36 and base body 32 and compressed between them.

The first set of screws 37 pull insulator plate 36 against base body 32, thereby securing printed circuit substrate 34 against base body 32.

Carrier 30 comprises recesses or openings 40 for receiving the heads 37*a* of the first set of screws 37. The heads 37*a* fit into the recesses or openings 40 and position illumination assembly 14 in the directions parallel to wall 29. In particular, the fit of the heads 32*a* in the recesses or openings 40 has a clearance of less than 1 mm, in particular of less than 0.5 mm.

Third Embodiment

Figure 6:
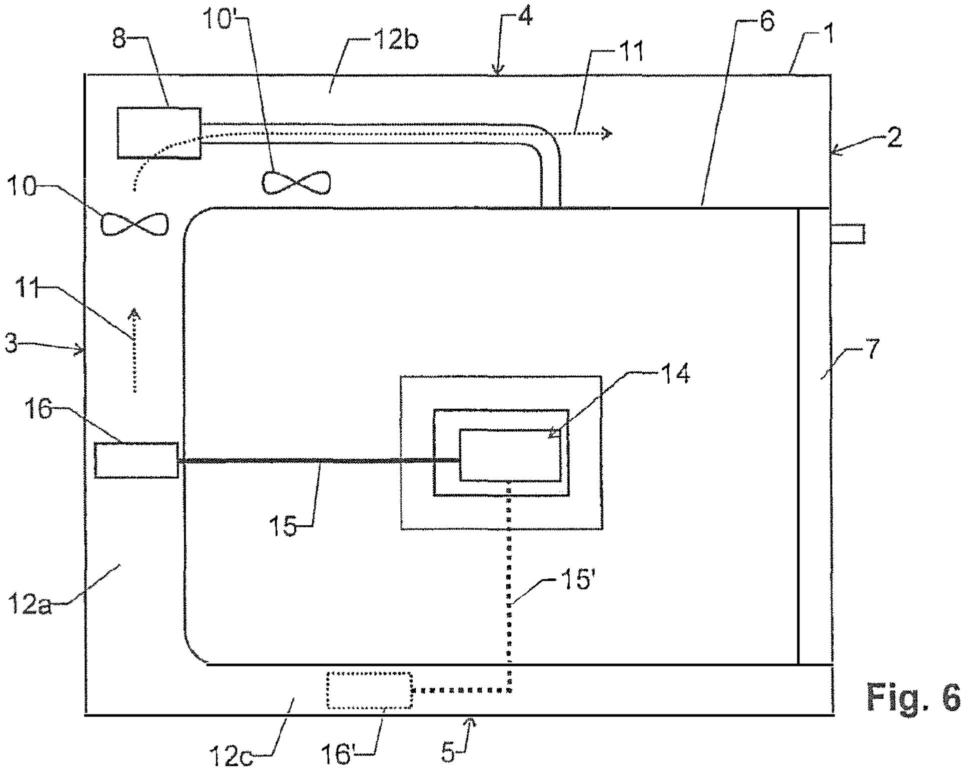
FIG. 6 is a schematic view of another embodiment of the oven.

FIG. 6 shows another embodiment of an oven. It basically corresponds to the one of FIG. 1, but here heat sink 16 is located at least partially farther away from font side 2 than any part of cooking chamber 6, in particular than the back side 6*b* of cooking chamber 6.

Also, in contrast to the embodiment of FIG. 1, heat sink 16 of FIG. 6 is located in the suction region 12*a* or (as indicated in dotted lines and under reference numbers 15' and 16') in the suction region 12*c* of fan 10.

In the embodiment shown, there is an LED light source at only one side of cooking chamber 6, namely at one of the vertical sides perpendicular to closed door 7. There may, however, also be LED light sources at two opposite sides of cooking chamber 6. One or more LED light source(s) may also be arranged at the ceiling of cooking chamber 6, at its rear side, and/or in its door 7.

In the embodiment of FIG. 6, there are two heat pipes 15 connecting one illumination assembly 14 to one heat sink 6. There may, however, also be several heat sinks thermally connected to one illumination assembly 14, with at least one heat pipe for each heat sink.

In the embodiments shown, fan 10 is used for cooling heat sink 6 as well as the microwave generator. There may, however, also be a separate fan for cooling heat sink 6 that is or is not used for cooling the microwave generator.

In particular, there may also be a fan 10', as shown in FIG. 6, which serves to cool not the microwave generator but just to carry off heat from other parts of the device. Heat sink 6 can also be arranged in the air duct of that fan.

Also, heat sink 6 may also be placed in a region without forced air convection. Natural convection or radiative heat transfer may e.g. suffice to cool it.

While there are shown and described presently preferred embodiments of the invention, it is to be distinctly understood that the invention is not limited thereto but may be otherwise variously embodied and practiced within the scope of the following claims.

What is claimed is:

1. A household oven comprising a cooking chamber, a light source mount, an LED light source arranged on said light source mount to shine light into said cooking chamber, a heat sink, a heat pipe thermally coupling said LED light source to said heat sink, at least one opening in a wall of said cooking chamber, wherein said LED light source is arranged adjacent to said opening, a printed circuit substrate, wherein said LED light source is mounted to a first side of said printed circuit substrate, a base body arranged on a second side of said printed circuit substrate, wherein a first end of said heat pipe is in contact with said base body and a second end of said heat pipe is in contact with said heat sink, a carrier mounted on an outside of said cooking chamber at said opening, wherein said base body is mounted to said carrier, and an insulator plate arranged between said base body and said carrier, wherein said printed circuit substrate is arranged between said insulator plate and said base body.

2. The household oven of claim 1 comprising an air duct arranged outside said cooking chamber and a fan located in or at said air duct, wherein said heat sink is at least partially arranged in or at said air duct.

3. The household oven of claim 2 further comprising an outer housing, wherein said cooking chamber is arranged within said outer housing and said air duct is located between said outer housing and said cooking chamber.

4. The household oven of claim 1 comprising a microwave generator coupled to said cooking chamber.

5. The household oven of claim 2 wherein a microwave generator is located at least partially in or at said air duct.

6. The household oven of claim 1 wherein said LED light source comprises at least one LED chip and wherein a distance between said LED chip and a center of said opening is no more than 10 mm.

7. The household oven of claim 4 wherein said opening is dimensioned to be non-transmitting for microwave radiation emitted b microwave generator.

8. The household oven of claim 1 further comprising a first set of screws pulling said insulator plate against said base body.

9. The household oven of claim 8 wherein said carrier comprises recesses or openings, wherein heads of said first set of screws fit into said recesses or openings.

10. The household oven of claim 1 further comprising a set of screws pulling said base body against said carrier.

11. The household oven of claim 1 wherein said heat sink is located at least partially higher than a top side of said cooking chamber.

12. The household oven of claim 1 further comprising a user door at a front side of said oven, wherein said heat sink is located at least partially further away from said front side than any part of said cooking chamber.

13. The household oven of claim 1 comprising at least two heat pipes arranged in parallel between said LED light source and said heat sink.

* * * * *